United States Patent [19]
Heider

[11] Patent Number: 5,932,680
[45] Date of Patent: *Aug. 3, 1999

[54] MOISTURE-CURING POLYURETHANE HOT-MELT ADHESIVE

[75] Inventor: Roland Heider, Hilden, Germany

[73] Assignee: Henkel Kommanditgesellschaft auf Aktien, Duesseldorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/741,448

[22] Filed: Oct. 30, 1996

Related U.S. Application Data

[63] Continuation of application No. 08/436,320, May 25, 1995, Pat. No. 5,599,895.

[30] Foreign Application Priority Data

Nov. 16, 1993 [WO] WIPO ................. PCT/EP93/03216

[51] Int. Cl.$^6$ .................................................. C08G 18/10
[52] U.S. Cl. .............................. 528/59; 528/67; 528/76; 528/80; 528/905; 525/440; 524/77; 36/19.5; 156/320; 156/324.4; 156/331.7; 252/182.22
[58] Field of Search ................................ 528/49, 59, 67, 528/76, 80, 905; 525/440; 524/77; 36/19.5; 156/320, 324.4, 331.7; 252/182.22

[56] References Cited

U.S. PATENT DOCUMENTS

| | | | |
|---|---|---|---|
| 3,012,987 | 12/1961 | Ansul ..................................... | 260/45.4 |
| 3,094,495 | 6/1963 | Gemeinhardt ............................ | 260/2.5 |
| 3,271,352 | 9/1966 | Weinberg .................................. | 260/37 |
| 3,428,609 | 2/1969 | Chilvers et al. ........................... | 260/75 |
| 3,509,232 | 4/1970 | Schoffenberger ........................ | 260/858 |
| 3,514,427 | 5/1970 | Owens .................................... | 260/41.5 |
| 3,691,117 | 9/1972 | Messerly ................................ | 260/18 |
| 3,705,132 | 12/1972 | Coscurida ................................ | 260/75 |

(List continued on next page.)

FOREIGN PATENT DOCUMENTS

| | | |
|---|---|---|
| 1077352 | 5/1980 | Canada . |
| 0107097 | 6/1984 | European Pat. Off. . |
| 0125008 | 11/1984 | European Pat. Off. . |
| 0196749 | 10/1986 | European Pat. Off. . |
| 0246473 | 4/1987 | European Pat. Off. . |
| 0223562 | 5/1987 | European Pat. Off. . |
| 0242676 | 10/1987 | European Pat. Off. . |
| 0244608 | 11/1987 | European Pat. Off. . |

(List continued on next page.)

OTHER PUBLICATIONS

F. Brenner telefax dated Mar. 25, 1996.
Product Butandioladipat dated Mar. 22, 1996, Hüls Corporation.
Product Hexandioladipat dated Mar. 22, 1996, Hüls Corporation.
"Ethylene Oxide Polymers", *Encyclopedia of Chemical Technology*, vol. 18, pp. 616–637, John Wiley & Sons, New York, NY, 1982.
J.L. Work, Dynamic Mechanical Properties of Urea–Ureathane Block Polymers, *Polymer Science and Technology*, vol. 4, Plenum.
"Thermal Degradation", *Encyclopedia of Polymer Science & Engineering*, vol. 4, p. 686, John Wiley & Sons, New York, NY, 1986.
Ernest W. Flick, Adhesive and Sealant Compounds and Their Formulations, pp. 313–315, Noyes Data Corporation, Park Ridge, NJ, 1978.
George Woods, "An Introduction to Polyurethanes", *The ICI Polyurethanes Book*, pp. 1–12, Polyurethanes and John Wiley & Sons, New York, NY 1987.
George Woods, "Polyurethane Adhesives, Binders, Paints, lacquers, Cellular Coatings and Other Materials", *The ICI Polyurethanes Book*, pp. 197–203, Polyurethanes and John Wiley & Sons, New York, NY 1987.
"Urethane Polymers", *Encyclopedia of Chemical Technology*, vol. 23, pp. 576–607, John Wiley & Sons, New York, NY, 1983.
"Compatability", *Encyclopedia of Polymer Science & Engineering*, vol. 3, pp. 762–765, John Wiley & Sons, New York, NY, 1985.
Ryong, –Joon Roe, "Glass Transition", *Encyclopedia of Polymer Science & Engineering*, vol. 7, pp. 531–544, John Wiley & Sons, New York, NY, 1987.
"Thermal Analysis", *Encyclopedia of Polymer Science & Engineering*, Supp. vol., pp. 702–708, ohn Wiley & Sons, New York, NY, 1989.
P. Wright & A.P.C. Cumming, "Thermoplastic Polyurethanes", *Solid Polyurethane Elastomers*, pp. 179–198, Gordon and Breach Science Publishers, New York,1969.

*Primary Examiner*—Rachel Gorr
*Attorney, Agent, or Firm*—Ernest G. Szoke; Wayne C. Jaeschke; Stephen D. Harper

[57] ABSTRACT

The hot-melt adhesive of the invention includes
  A) at least one polyurethane prepolymer of
    a) at least one polyisocyanate, in particular, toluene diisocyanate and/or MDI,
    b) at least one polyalkylene glycol at a concentration of more than 10% by weight based on total hot-melt adhesive, in particular, polypropylene glycol,
    c) at least one polyester glycol, preferably of at least two polyester glycols having different glass transition temperature, and
  B) optional additives such as
    d) a resin, particularly a hydrocarbon resin, and
    e) a stabilizer, particularly toluenesulfonyl isocyanate.
Preferably, the hot-melt adhesive has a melt viscosity ranging from 10 to 300 Pa.s at 130° C. The PU pre-polymer has only one single Tg in the DSC diagram. The hot-melt adhesive is notable for its high creep resistance with similarly high initial and final strength. Thus, it is predominantly used in the shoe industry, particularly in coating machines integrable in the shoe production line not including a pre-crosslinking stage using steam or a drying channel. Preferably, the hot-melt adhesive is produced using the single step process.

34 Claims, No Drawings

U.S. PATENT DOCUMENTS

| | | | |
|---|---|---|---|
| 3,730,927 | 5/1973 | Schloss | 260/29.2 |
| 3,829,533 | 8/1974 | Matsui et al. | 260/858 |
| 4,321,173 | 3/1982 | Schuhmacher et al. | 525/453 |
| 4,381,388 | 4/1983 | Naples | 528/59 |
| 4,403,085 | 9/1983 | Christenson et al. | 528/45 |
| 4,552,934 | 11/1985 | Rabito | 525/458 |
| 4,561,922 | 12/1985 | Peerman et al. | 156/331.4 |
| 4,585,819 | 4/1986 | Reischle et al. | 524/196 |
| 4,618,651 | 10/1986 | Gilch | 525/130 |
| 4,623,709 | 11/1986 | Bauriedel | 528/65 |
| 4,624,996 | 11/1986 | Rizk et al. | 525/453 |
| 4,667,661 | 5/1987 | Scholz et al. | 128/90 |
| 4,737,566 | 4/1988 | Pedain et al. | 528/76 |
| 4,756,785 | 7/1988 | Koenig et al. | 156/307.3 |
| 4,775,719 | 10/1988 | Marlevla | 525/125 |
| 4,882,408 | 11/1989 | Blum | 528/49 |
| 4,891,269 | 1/1990 | Markevka et al. | 428/423 |
| 4,929,667 | 5/1990 | Ban et al. | 524/718 |
| 4,946,535 | 8/1990 | Meckel | 528/83 |
| 4,957,959 | 9/1990 | Matsumoto et al. | 524/196 |
| 4,999,407 | 3/1991 | Gilch | 525/457 |
| 5,039,573 | 8/1991 | Bravet et al. | 428/423.1 |
| 5,070,114 | 12/1991 | Watts et al. | 521/159 |
| 5,091,444 | 2/1992 | Bauer et al. | 523/209 |
| 5,115,073 | 5/1992 | Meckel et al. | 528/83 |
| 5,166,300 | 11/1992 | Rumon et al. | 528/65 |
| 5,166,302 | 11/1992 | Werner et al. | 528/67 |
| 5,173,538 | 12/1992 | Gilch et al. | 525/130 |
| 5,190,607 | 3/1993 | Werner et al. | 156/331.1 |
| 5,599,895 | 2/1997 | Heider | 528/59 |

FOREIGN PATENT DOCUMENTS

| | | |
|---|---|---|
| 0248658 | 12/1987 | European Pat. Off. . |
| 0369607 | 10/1989 | European Pat. Off. . |
| 0340906 | 11/1989 | European Pat. Off. . |
| 0369607 | 5/1990 | European Pat. Off. . |
| 0421154 | 4/1991 | European Pat. Off. . |
| 0455400 | 11/1991 | European Pat. Off. . |
| 0472278 | 2/1992 | European Pat. Off. . |
| 0511566 | 11/1992 | European Pat. Off. . |
| 2609266 | 9/1976 | Germany . |
| 2626132 | 12/1977 | Germany . |
| 3236313 | 4/1984 | Germany . |
| 3502379 | 7/1986 | Germany . |
| 3613145 | 11/1986 | Germany . |
| 3524333 | 1/1987 | Germany . |
| 3717070 | 12/1988 | Germany . |
| 4001348 | 7/1991 | Germany . |
| 1385340 | 2/1975 | United Kingdom . |
| 2137638 | 10/1984 | United Kingdom . |
| 2233657 | 1/1991 | United Kingdom . |
| 9115530 | 1/1991 | WIPO . |

MOISTURE-CURING POLYURETHANE HOT-MELT ADHESIVE

This application is a continuation of Ser. No. 08/436,320, now U.S. Pat. No. 5,599,895, filed May 25, 1995.

BACKGROUND OF THE INVENTION

1. Field of the Invention

This invention relates to a moisture-curing hot-melt adhesive, its production and its use in the shoe industry.

2. Discussion of Related Art

A "moisture-curing polyurethane hot-melt adhesive" is understood to be an adhesive largely free of solvents and having urethane groups, which is solid at room temperature and following application in the form of its melt physically binds not only by cooling but also by chemical reaction of still present isocyanate groups with moisture. It is only subsequent to such chemical curing with increase in molecule size that the adhesive receives its final characteristics.

Such moisture-curing polyurethane hot-melt adhesives are known for various substrates:

EP 0,421,154 describes a rapidly crystallizing polyurethane system containing isocyanate groups which is based on a polyester diol A having a melting point of from 30 to 60° C. and a polyester diol B having a melting point of from 65 to 150° C. and a polyisocyanate D. In addition, it may contain a diol C having a molecular weight of <400 as a chain extender. The polyurethane system may be directly prepared from these components in a single step but multiple steps are possible as well. The thus obtained polyurethane system is partially crystalline and is intended to be used as an assembly adhesive but specifically, as a book-binding adhesive.

DE 3,236,313 describes a hot-melt adhesive which consists of from 20 to 90% by weight of a prepolymeric isocyanate and from 5 to 50% by weight of a low molecular weight ketone resin and, in addition, may contain from 0 to 75% by weight of a thermoplastic polyurethane. The prepolymeric isocyanate is a reactive polyurethane prepolymer of 1. an aromatic diisocyanate and/or
2. a prepolymer of said isocyanate, and of
3. a polyether or a polyester having OH groups, and
4. a short-chain diol.

In the only preparative example, there is added in addition to 516 g of a polyester diol another 74 g of tripropylene glycol as a chain extender. The prepolymer is prepared from the components in a single step and has a viscosity of from 50 to 40,000 Pa.s at 20° C. The hot-melt adhesive is suitable for bonding thermoplastic and thermo setting adhesives, foamed material, lacquered surfaces, wood and wooden materials, paper, leather, artificial leather, rubber, textiles, non-woven materials, and metals.

EP 0,340,906 describes a polyurethane hot-melt adhesive containing a mixture of at least two amorphous polyurethane prepolymers conferring different glass transition temperatures to the hot-melt adhesive which are above and below room temperature, respectively. The prepolymers are prepared from polyisocyanates and various diols, namely, preferably polyester diols on the one hand and, preferably polyester, polyether and other polymer diols on the other hand. The hot-melt adhesive is prepared by either mixing the individually prepared prepolymers or by preparing the second prepolymer in the first. As a rule, there are obtained opaque hot-melt adhesives at room temperature which, according to the example, have a viscosity of 91 Pa.s at 130° C. The polyurethane hot-melt adhesive is used for wood bonding.

EP 0,369,607 describes a moisture-curing polyurethane hot-melt adhesive containing at least two polyurethane prepolymers, wherein the first prepolymer has a glass transition temperature of above room temperature and the second prepolymer has a glass transition temperature below same. The hot-melt adhesive is prepared from polyisocyanate and various diols, namely, from a polyether diol on the one hand, and a polyether, polyester or polybutadiene diol on the other hand. Example III contains 8.5% by weight of a polyester diol. It is indicated that the polyurethane hot-melt adhesive may be prepared in a single or in multiple steps. As a rule, it is transparent at room temperature and, according to Example 1, has only one single glass transition temperature. According to the Examples, its viscosity is between 6.8 and 20 Pa.s at 130° C. The hot-melt adhesive has been used for bonding wood, plastics and textiles.

EP 0,472,278 describes an adhesive of a polyalkylene ether diol, a polyalkylene ether triol, a polyester polyol, and an aliphatic isocyanate. It is a moisture-curing hot-melt adhesive for textiles, wood, metal, leather, and plastics.

EP 0,242,676 describes a process for preparing polyurethanes having free isocyanate groups, which are soluble in aromatics, suitable as varnish binders and are obtained by reacting diisocyanates, macropolyols having a molecular weight of from 500 to 10,000 and low molecular weight polyols having a molecular weight of from 62 to 499. These latter are strongly branched diols such as 2,2,4-trimethylpentane-1,3-diol, the hydroxyl groups of which may further be etherified by two ethoxy or propoxy units. The polyurethanes are present as a solution and are used in moisture-curing one-component varnishes.

EP 0,511,566 describes a moisture-curing polyurethane hot-melt adhesive consisting of a) a polyol component which is liquid at room temperature and has an average molecular weight of from 500 to 5,000, and b) a polyol component which is crystalline at room temperature and has a molecular weight of from 500 to 10,000, and a mixture of a polyisocyanate component having two differently reactive NCO groups and a diisocyanate component having an NCO reactivity to hydroxy groups which is greater than that of the less reactive NCO groups of the polyisocyanate component with two differently reactive NCO groups. Preferably, the hot-melt adhesives are used for bonding glass and glass-plastic composites.

EP 0,455,400 describes a moisture-curing polyurethane hot-melt adhesive essentially consisting of the following mixture:

a) 10 to 90 parts by weight of a first polyurethane prepolymer of polyhexamethylene adipate, and b) 90 to 10 parts by weight of a second polyurethane prepolymer of polytetramethylene glycol having a molecular weight Mn of at least 500.

This hot-melt adhesive is suitable for bonding certain synthetic polymers, wood, paper, leather, rubber, textiles, including non-wovens, and metals.

Furthermore, it is known to use moisture-curing polyurethane hot-melt adhesives in the shoe industry.

Thus, EP 0,125,008 describes a process for bonding a shoe sole to a shoe upper. The polyurethane is prepared from a diisocyanate, a hydroxypolyester and a monofunctional reactant, wherein the monofunctional reactant preferably is an aliphatic alcohol having from 4 to 14 carbon atoms and a boiling point of above 100° C. Following adhesive application and prior to actual bonding by heating and pressing, the adhesive is subjected to humidity to extend the chains. This requires from 10 to 15 minutes at 80 to 110° C. and a moisture corresponding to a dew point of from 40 to 60° C. and subsequent treatment at atmospheric humidity for 10 minutes to 18 hours.

Another process for attaching a sole to a shoe is described in EP 0,223,562. First, a moisture-curing solvent-free hot-melt adhesive is applied to the sole and/or the shoe upper material, then the adhesive coating is subjected to hot-curing with moisture until eventually, sole and shoe upper material are pressed together.

Likewise, DE 2,609,266 describes a process for bonding shoe soles to shoe uppers. The hot-melt adhesive is prepared by reacting a diisocyanate with a polymeric polyol having a crystalline melting point of from 40 to 90° C. Following application of the adhesive, the latter is, e.g., contacted with water, and then the thus treated coating in a heat-softened condition is pressed to a surface compatible therewith.

However, known moisture-curing polyurethane hot-melt adhesives have severe drawbacks when applied in the shoe industry which oppose wide range economic application:

The adhesive, if ever possible, should not contain any toxic substances, in particular, no solvents.

Coating should be possible at a temperature not too high for the shoe materials.

The shoe materials to be bound are predominantly leather and rubber.

The adhesive should have suitable flow behavior and good wetting at any application temperature so that it can be coated without problems.

The adhesive bond should have sufficient initial strength for further processing. Specifically, this holds for creep resistance and initial strength, where curing should be effected in an adequate period of time and at ambient conditions, if possible. That is, the adhesive should be cured within a few minutes to such extent that its surface is no longer tacky so that subsequent to cooling, coated soles and shoe uppers may be easily handled and stored without sticking to each other. Moreover, the bond between sole and shoe upper should initially be so strong that it will come loose neither immediately nor subsequent to storage due to small but steady forces. Hence, sufficient initial strength and above all, high creep resistance must be achieved within the time intervals of shoe production. Curing is desired to occur at normal ambient conditions of sole storage (20±5° C., ca. 10% relative humidity) within 24 hours, if possible, but within 7 days at latest.

In use, the adhesive bond should be sufficiently strong and flexible. The cold temperature flexibility is of particular significance.

Thus, the object of the invention is to provide the shoe industry with a moisture-curing polyurethane hot-melt adhesive coatable by machines integrated in the shoe production line not including any previous crosslinking by steam and drying in a climatic channel. To this end, the adhesive is required, in particular, to gain high creep resistance with sufficient initial strength and final strength in an adequate period of time. The other characteristics of processing and use should not be deteriorated. In particular, this holds for non-toxicity and cold temperature flexibility.

SUMMARY OF THE INVENTION

The solution according to the invention is stated in the claims and consists in a moisture-curing polyurethane hot-melt adhesive containing the following components:

A) at least one polyurethane prepolymer of
   a) at least one polyisocyanate,
   b) at least one polyalkylene glycol at a concentration of more than 10% by weight based on total hot-melt adhesive,
   c) at least one polyester glycol, and
B) optional additives such as
   d) a resin, and
   e) a stabilizer.

DETAILED DESCRIPTION OF THE INVENTION

A "polyurethane prepolymer" is understood to be an oligourethane having isocyanate groups which is to be regarded as an intermediate on the way to the crosslinked polyurethanes. "At least" one polyurethane prepolymer is to indicate that the adhesive has at least one maximum in the molecular weight distribution curve. As a rule, this number corresponds to the number of individually prepared prepolymers which, on purely physical mixing, result in the polyurethane hot-melt adhesive. Thus, for practical reasons, the upper limit of the number of prepolymers is 3.

A "polyisocyanate" is understood to be a low molecular weight compound having from 2 to 3 isocyanate groups. Preferable are diisocyanates, but there may be contained up to about 10% by weight of a trifunctional isocyanate. However, with increasing content of trifunctional isocyanate, undesired crosslinking both in production and use of the hot-melt adhesive must be expected. In addition to aliphatic and cycloaliphatic polyisocyanates, aromatic polyisocyanates are possible above all. Specific examples are: toluene diisocyanate, diphenylmethane diisocyanate and mixtures thereof. Diphenylmethane diisocyanate is understood to be both 4,4'- and 2,4'-diphenylmethane diisocyanate. Preferably, the 2,4'-isomer should not exceed 50% by weight. It is preferred to employ one or two different polyisocyanates. Above all, pure 4,4'-diphenylmethane diisocyanate is used. Among other, its admixture with the 2,4'-isomer affects the content of unreacted diisocyanate, thermal stability and the duration of adhesive film reactivability. The polyisocyanate proportion in the hot-melt adhesive should be from 15 to 35, preferably from 20 to 30% by weight.

A "polyalkylene glycol" is understood to be a linear polyether having 2 OH groups. Preferably, it has the general formula HO(—R—O)$_m$—H, wherein R is a hydrocarbon residue having from 2 to 4 C atoms. Similarly, copolymers are possible, namely, both block copolymers and random copolymers. Specific polyalkylene glycols are: polyethylene glycol, polytetramethylene glycol and, above all, polypropylene glycol [R=—CH$_2$—CH(CH$_3$)—]. Preferably, only one type of polyalkylene glycol is employed. However, it is also possible to use mixtures of from 2 to 3 polyalkylene glycols differing in their average molecular weight or in the nature of their components.

The amount of polyalkylene glycol to be used—in particular, polypropylene glycol—is at least 10% by weight, preferably from 10 to 70, and particularly from 15 to 35% by weight, based on total polyurethane hot-melt adhesive, respectively.

Above all, pure polypropylene glycol is of interest. As a rule, its average molecular weight should be between about 250 and 1,000, preferably between 350 and 600, and most specifically, between 400 and 450 (this is understood to be the number average obtained from OH determinations). Outside the indicated range, there is a significant reduction in positive effects. These are, among other, high initial strength (=strength prior to curing), high creep resistance (=dimensional stability under the influence of small but steady forces), and the good flow characteristics at application temperatures.

Circumstantially, the use of other polymeric diols outside the preferred range is also possible for this purpose, e.g., polyester diols having the same molecular weight, or tetraethylene glycol in the same amount as polypropylene glycol. Preferably, the amount of these polymeric diols outside the preferred range should not be greater than that of the preferred polyalkylene glycols.

A "polyester glycol" is understood to be a polyester having 2 OH groups, preferably 2 terminal OH groups. Preparation is by known routes, either from a) aliphatic hydroxycarboxylic acids, or from b) aliphatic dicarboxylic acids having from 6 to 12 C atoms and—particularly even-numbered—diols having from 4 to 8 C atoms.

Of course, other appropriate derivatives may be used, e.g., lactones, methyl esters or anhydrides. Specific starting materials are: 1,4-butanediol, 1,6-hexanediol, adipic, azelaic and sebacic acids and lactones. The acid component may include up to 25% on a molar basis of other acids, for example, cyclohexanedicarboxylic acid, terephthalic acid and isophthalic acid. The glycol component may include up to 15% on a molar basis of other diols, for example, diethylene glycol and 1,4-cyclohexanedimethanol. In addition to homopolymers from the above components, above all, copolyesters from the following components or derivatives thereof are of importance:

1. adipic acid, isophthalic acid, phthalic acid, and butanediol;
2. adipic acid, phthalic acid and hexanediol;
3. adipic acid, isophthalic acid, phthalic acid, ethylene glycol, neopentylglycol, and 3-hydroxy-2,2-dimethylpropyl-3-hydroxy-2,2-dimethyl propanoate; and
4. adipic acid, phthalic acid, neopentylglycol, and ethylene glycol.

The copolyester from adipic acid, isophthalic acid, phthalic acid, and butanediol is partially crystalline and has a high viscosity. Hence, it results in high initial strength. The copolyester from adipic acid, phthalic acid and hexanediol has low glass transition temperature and therefore, results in improved cold temperature flexibility.

Thus, the polyester glycols are either liquid or solid. In case they are solid, they are preferably amorphous. However, they can be weakly crystalline as well. Preferably, a mixture of partially crystalline and amorphous polyesters is employed. However, crystallinity is developed so weakly that it does not show by way of opaqueness in the final hot-melt adhesive. The melting point of the partially crystalline polyester is in the range of from 40 to 70° C., preferably in the range of from 45 to 65° C. The melting point indicates the temperature at which the crystalline regions of the material are melting. It is determined by differential thermoanalysis through the main endothermic peak. Preferably, a polybutanediol adipate having a molecular weight of about 3,500 and a melting point of about 50° C. is used as the partially crystalline polyester glycol.

The average molecular weight (Mn) of the polyester glycol should be between 1,500 and 30,000, preferably between 2,500 and 6,000. It is calculated from the OH number. The molecular weight of the polyester glycol is of some significance: increasing molecular weight makes extrusion of the hot-melt adhesive and penetration into leather more difficult, and decreasing molecular weight results in the hot-melt adhesive being not sufficiently solid at room temperature.

The polyester glycols have a glass transition temperature (Tg) in the range of preferably from −40° C. to +50° C. and, in particular, in the range of from −40° C. to +40° C. The Tg is determined on the basis of DSC measurements as the center point of the step using a ratio of 10° C./min in the second run.

Particularly suitable polyester glycols include those having a glass transition temperature of about −40° C. to +40° C., a viscosity of about 3,000 to about 30,000 mPa.s at 130° C. (Brookfield, RVDV II+Thermocell) and a hydroxyl number of about 27 to 60.

Preferably, a mixture of from 2 to 6, specifically from 2 to 4 polyester glycols having different glass transition temperatures is employed. At least one polyester glycol should have a glass transition temperature of below and one of above 0° C., with the glass transition temperatures being at least 10, preferably at least 30° C. apart from each other. The proportion of polyester glycols having low glass transition temperature should be in the range of from 30 to 100% by weight, preferably from 50 to 90% by weight, based on the total amount of polyester glycol.

The creep resistance of the hot-melt adhesive (=dimensional stability of bond to irreversible deformation on prolonged action of minor forces) is not only improved by the polyester glycols but also by addition of hydrocarbon resins. These are understood as being petroleum, coal tar and terpene resins. Generally, they have a molecular weight of less than 2,000. Preferred hydrocarbon resins are modified aromatic hydrocarbon resins, terpene resins such as, e.g., α- and β-pinene polymers, low molecular weight polystyrenes such as poly-α-methylstyrene, rosin esters and coumaroneindene resins. Of course, these materials also act as tackifiers.

Their weight proportion in the hot-melt adhesive is from 0 to 15, particularly from 3 to 10% by weight.

Stabilizers are understood to be additives intended to maintain the physical properties constant, if ever possible, particularly melt viscosity and color. To this end, at least one of the following substances mentioned as examples may be used: phosphoric acid, phosphorous acid and toluenesulfonyl isocyanate. Conveniently, from 0 to 0.5, in particular, from 0.01 to 0.1% by weight of the toluenesulfonyl isocyanate stabilizer is added.

In order to accelerate the curing reaction, the known polyurethane catalysts may be added, for example, diorganotin compounds such as dibutyltin dilaurate or a mercaptotin compound. Their amount ranges from 0 to 1.5, in particular, from 0.5 to 1% by weight based on the weight of prepolymer.

Preferably, however, the hot-melt adhesives of the invention do not contain any solvents which are understood to be inert organic compounds having boiling points of up to 200° C. at normal pressure. Furthermore, the hot-melt adhesives of the invention preferably do not contain any inert fillers such as clays, carbonates and titanium dioxide.

The hot-melt adhesive of the invention is composed of the above components, preferably as follows:

a) from 15 to 35% by weight of polyisocyanate, b) from 10 to 70, in particular, from 15 to 35% by weight of a polyalkylene glycol, c) from 5 to 65, in particular, from 30 to 50% by weight of a polyester glycol, d) from 0 to 15, in particular, from 3 to 10% by weight of a resin, and e) from 0 to 0.5, in particular, from 0.01 to 0.1% by weight of a stabilizer.

However, not only the weight range of the individual components but also their weight ratio relative to each other is of importance. Thus, the ratio of reactive groups NCO:OH should be from 1.1:1 to 2:1, in particular, from 1.15:1 to 1.5:1. For a specific adhesive composition, the NCO:OH ratio is to be selected such that the hot-melt adhesive has a useful molecular weight, i.e., the latter should be sufficiently high in order to obtain good initial strength but, on the other hand, should be sufficiently low so that viscosity—even without solvent—will be sufficiently low in both preparation and use. In addition, the hot-melt adhesive further should have at least from 0.5 to 3, preferably from 1.0 to 2 g of free NCO groups per 100 g of hot-melt adhesive to obtain sufficient curing by moisture. The NCO content is determined by titration.

The melt viscosity of the polyurethane hot-melt adhesive of the invention generally ranges from 10 to 300 Pa.s, preferably from 20 to 100 Pa.s. The melt viscosity is determined according to Brookfield at 130° C. by preheating the sample at 130° C. for 15 minutes and reading the value subsequently.

Moreover, type and amount of the individual components must be selected such that they will be compatible. Evidence for this is to be seen therein that the polyurethane prepolymer preferably has only one single glass transition temperature (Tg) in the DSC diagram, wherein the second cycle at a temperature increase of 10° C.//min is decisive.

The polyurethane prepolymer of the invention may be prepared both in a single step and in multiple steps. In the multiple step process, for example, the polyisocyanate is initially reacted separately with the polyalkylene glycol and the polyester glycol, respectively, and the reaction products are then mixed together. It is also possible to initially react the polyisocyanate with only the polyalkylene glycol or with only the polyester glycol and to further react this pre-product in the presence of all the other reactants.

Preferably, however, the polyurethane prepolymer of the invention is prepared using the single step process. To this end, the polyester and polyalkylene glycols are mixed first and then dehydrated at 110 to 130° C. for 60 minutes in a vacuum. Subsequent to cooling the mixture to about 90° C., the polyisocyanate is added. The reaction mixture is re-heated at 110 to 130° C. In case no catalyst is added, it will generally take about 60 minutes until the reaction under vacuum is virtually completed, i.e., OH groups are no longer detectable or are present in an amount of 2 g/100 g of prepolymer at maximum or the desired viscosity is reached.

In case the desired additives have not been added as early as during formation of the polyurethane prepolymer, they must be added and homogenized now.

As the polyurethane prepolymer has reactive NCO groups, the polyurethane hot-melt adhesive is sensitive to airborne moisture. Therefore, it is necessary to protect it from moisture during storage. For this purpose, it is conveniently stored in a sealed, dry and moisture-proof container of aluminum, tinned sheet iron or composite sheets.

Essentially, the hot-melt adhesive of the invention is notable for the following valuable properties:

It does not contain any solvent. The concentration of non-reacted MDI's is less than 2.0%, in particular, less than 1.0% by weight.

It is stable during storage, i.e., there is no demixing. It is relatively stable at the coating temperature of, e.g., 170° C., i.e., the melt viscosity varies in a range of ± one third at maximum, preferably one fifth of the initial value within 4 hrs.

It may be coated easily at 110 to 180° C. as a free flowing melt.

Both rubber and leather are sufficiently wetted, and the hot-melt adhesive even penetrates relatively deep into fibrous materials.

Prior to solidification, there is sufficient time for relative positioning of the parts to be joined.

Immediately on cooling at ambient conditions, bonds having high initial strength and high creep resistance are formed. Moreover, the coatings are non-tacky subsequent to cooling.

Within usual storage periods for semi-finished shoe products, acceptable strength is obtained. In addition, the bonds are flexible at low temperatures as well.

The bond is transparent.

Subsequent to curing, the bond is highly water-resistant.

Due to such positive characteristics, the hot-melt adhesives of the invention are suited preferably for use in the shoe industry, particularly in coating machines integrable in the shoe production line not including a pre-crosslinking stage using steam or a drying channel.

"Shoe" is understood to be the outer footwear and, namely, not only the ready-for-sale final product but also the intermediate products therefor.

"Sole" is understood to be the shoe tread member including heels.

The hot-melt adhesives of the invention are particularly suitable for attaching soles to shoe uppers and moreover, for attaching substrates under tension and for leather bonding as well.

Therefore, the invention similarly relates to the use of the adhesives of the invention in attaching soles to shoe upper material, in particular, of leather, using the following processing steps:

1. optionally, pretreatment of sole and/or shoe upper material, for example, by roughing, priming, halogenating, solvent-wiping, etc.;
2. coating one layer of melt adhesive at 110 to 180° C. on at least one of the surfaces to be attached, wherein the other one is not required to contain any adhesive or a solvent adhesive or a dispersion adhesive;
3. pressing together the surfaces to be bonded; and
4. optionally, cooling the surfaces to be bonded.

Conveniently, prior to coating the hot-melt adhesive of the invention, sole or shoe upper material are pretreated. This involves known methods such as roughing, solvent-wiping or priming using a primer, or halogenation of certain rubber components.

Preferably, the hot-melt adhesive does not contain any solvent during coating.

Preferably, the adhesive is coated in a thickness of from 0.05 to 0.7 mm using a coating machine. Following coating of one layer of hot-melt adhesive and prior to pressing together the surfaces to be bonded, the hot-melt adhesive may also be cooled and the pre-finished material may be stored as long as final curing is avoided. Prior to pressing together, the sample must be re-heated at 110 to 180° C. in case the adhesive was applied to only one substrate, and at 50 to 100° C. in case both substrates were coated with adhesive.

Final curing may be carried out using various conditions. In particular, they are achieved through action of airborne moisture where the relative humidity should not be greater than 25% at 20° C. Under these conditions, the final curing will take at least 24 hours. However, ambient conditions may also vary, e.g., in the range of 20±5° C. Nevertheless, relative humidity should not be below 10% to obtain final curing within a period of from 3 to 7 days.

Using the hot-melt adhesive of the invention in the shoe industry results in the following advantages:

It permits a system which is readily integrable into the production line.

It permits significantly higher productivity due to high creep resistance and initial strength.

The strength of the bonds to leather is surprisingly good. Circumstantially, unilateral coating, e.g., with PU soles, is sufficient.

Therefore, the present invention similarly relates to shoes manufactured using the adhesive of the invention.

The invention will be discussed in more detail below by way of example.

EXAMPLES

A) Starting Materials:

Polyester A is a partially crystalline copolyester glycol comprising isophthalic acid, butanediol, phthalic acid dimethylester and adipic acid. Polyester A has a molecular weight of about 3500, a hydroxyl number of 27 to 34 as determined according to DIN 53,240, a glass transition temperature of about −20° C. as determined by DSC, and a viscosity at 100° C. of about 30,000 mPa.s and at 130° C. of about 5,000 mPa.s, determined with a Brookfield viscosimeter (LVT4).

Polyester B is a partially crystalline copolyester glycol comprising phthalic acid dimethylester, adipic acid and hexanediol. It has a molecular weight of about 3500, a hydroxyl number of 27–34 as determined according to DIN 53,240, a glass transition temperature of about −40° C. as determined by DSC, and a viscosity at 130° C. of about 3,000 mPa.s, determined with a Brookfield viscosimeter (LVT4).

Polyester C is a solid, amorphous copolyester glycol comprising isophthalic acid, neopentyl glycol, ethylene glycol, adipic acid, phthalic acid, and 3-hydroxy-2,2-dimethylpropyl-3-hydroxy-2,2-dimethyl propanoate. It has a molecular weight of about 3,500, a hydroxyl number of 31–39 as determined according to DIN 53,240, a glass transition temperature of about +30° C. as determined by DSC, and a viscosity at 130° C. of about 30,000 mPa.s determined with a Brookfield viscosimeter (LVT4).

Polyester D is a solid, amorphous copolyester glycol comprising neopentyl glycol, ethylene glycol, adipic acid, and phthalic anhydride. It has a molecular weight of about 2,000, a hydroxyl number of 50–60 as determined according to DIN 53,240, a glass transition temperature of about +10° C. as determined by DSC, and a viscosity at 80° C. of about 70,000 mPa.s and at 130° C. of about 5,000 mPa.s determined with a Brookfield viscosimeter (LVT4).

Polyester H is a very weakly crystalline, saturated, copolyester glycol having a viscosity number of 77–83 cm$^3$/g as determined according to DIN 53,728, a softening point of 102–110° C. as determined according to DIN 52,011, a glass transition temperature of about −12° C. as determined by DSC, and a melt viscosity at 180° C. of 65–75 Pa.s and at 200° C. of 35–40 Pa.s as determined with a rotating viscosimeter (plate/cone), and a molecular weight of ca. 25,000 via OH number.

Polyester I is a solid, amorphous copolyester glycol having a molecular weight of about 3,500, a hydroxyl number of 27–34 as determined according to DIN 53,240, a glass transition temperature of about 20° C. as determined by DSC, and a viscosity at 130° C. of about 7,000 mPa.s determined with a Brookfield viscosimeter (LVT4). The polyester materials are commercially available from Hüils AG, Troisdorf, Germany.

The polypropylene glycol has a molecular weight of about 425 and is available from Miles Inc., Pittsburgh, Pa.

The tackifier is a polymerized β-pinene resin available from Hercules Inc., Wilmington.

The hydrocarbon resin is available from Arizona Chemical Co., Panama City, and serves as a tackifier and to increase creep resistance.

The 4,4'-diphenylmethane diisocyanate (MDI) is available from Miles Inc., Pittsburgh.

B) Preparation

In the following examples, the polyurethane adhesives were prepared by dehydrating the specified amounts of polyester glycol or polyester glycol mixture and polypropylene glycol, and optionally the polymerized β-pinene resin, at a temperature of from about 110° C. to about 130° C. in vacuum for about 60 minutes. After cooling to about 90° C., the mixture was reacted with the given amount of 4,4'-diphenylmethane diisocyanate (MDI) at a temperature of from about 110° C. to about 130° C. in vacuum for about 60 minutes. Following the reaction, the prepolymer was placed in a moisture-proof container.

C) Examination

Viscosity was measured using a Brookfield Thermocell viscosimeter: after heating a tube of the polyurethane hot-melt for 15 minutes at the specified temperatures, the value was taken. The melt stability of the polyurethane melt was determined by measuring the increase in viscosity during 2 hours, mostly at 130° C.

The peel strength was examined using test specimen of SBR (styrene-butadiene rubber) 2.5 cm in width and from 10 to 12 cm in length. The strips were dipped in a primer solution for about 5 s, and then dried for about 30 minutes at 100° C. in an oven. The shoe upper material was either leather or polyurethane-coated fabric which was conventionally roughened. The adhesive was applied in about a 0.5 mm thick layer on the heated and primed SBR sample. The heated shoe upper was pressed onto the SBR sample first by hand, then in a press at a pressure of from 7 to 14 bars (100–200 psi) for about one minute. Alternatively, the adhesive was applied on both preheated surfaces, pressed together by hand first, and then in a press at a pressure of from 7 to 14 bars (100–200 psi) for about one minute. After the specified time periods the samples were evaluated for peel strength by placing them in an Instron tensile machine and peeling them apart at a speed of 1.25 cm/min.

The mature bond strength is the peel strength in cured condition after 7 days.

The creep resistance was examined by attaching a weight of 500 g to the uncemented portion of the upper shoe material of the samples used in the peel strength test. Creep resistance is measured in mm/h. A value of below 10, in particular, below 5 mm/h is regarded as "good". After curing of the adhesive, this test was conducted at different temperatures to also evaluate the heat resistance of the adhesive.

The following Examples 1–5 demonstrate the effect of the number of polyester glycols on the initial strength (=peel strength after 5 min).

Examples

| | Examples | | | | |
|---|---|---|---|---|---|
| | 1 | 2 | 3 | 4 | 5 |
| Polyester A | 47.6% | 24.8% | 16.5% | 14.1% | 23.3% |
| Polyester B | — | — | 16.5% | 14.1% | 11.7% |

-continued

|  | Examples | | | | |
|---|---|---|---|---|---|
|  | 1 | 2 | 3 | 4 | 5 |
| Polyester C | — | 24.8% | 16.5% | 28.3% | 5.8% |
| Polyester D | — | — | — | — | 5.8% |
| Polypropylene glycol | 23.8% | 24.8% | 24.5% | 17.7% | 23.3% |
| Tackifier | 4.8% | — | — | — | 5.8% |
| Hydrocarbon resin | — | — | — | 5.3% | — |
| MDI | 23.8% | 25.6% | 26.0% | 20.5% | 24.3% |
| NCO:OH | 1.4 | 1.4 | 1.4 | 1.4 | 1.4 |
| Viscosity [Pa · s] | | | | | |
| 90° C. | 190 | 375 | 310 | 98 | — |
| 110° C. | 55 | 130 | 75 | 60 | — |
| 130° C. | 22 | 52 | 26 | — | 26 |
| 150° C. | — | — | — | — | — |
| 170° C. | — | — | — | — | — |
| Peel strength (SBR/Man made) [kg/cm] | | | | | |
| after 5 min | 0.4–0.9 | 4.1–5 | 1.8–2.5 | 4.6–5 | 2.2 |
| after 3 days | 5–5.7 | — | — | — | — |
| Creep resistance | — | — | — | — | good |
| Mature bond strength (leather/SBR) [kg/cm] | | | | | |
| after 7 days | — | — | — | — | 5.3 |

Further Examples according to the invention (6–11):

|  | Examples | | | |
|---|---|---|---|---|
|  | 6 | 7 | 8 | 9 |
| Polyester A | 29.2% | 23.3% | 29.1% | 23.4% |
| Polyester B | 5.8% | 11.6% | 5.8% | 11.7% |
| Polyester C | 5.8% | 1.2% | 1.1% | 10.5% |
| Polyester D | 5.8% | 10.5% | 10.5% | 1.2% |
| Polypropylene glycol | 23.3% | 23.3% | 23.3% | 23.4% |
| Tackifier | 5.8% | 5.8% | 5.8% | 5.9% |
| Hydrocarbon resin | — | — | — | — |
| MDI | 24.3% | 24.3% | 24.3% | 23.9% |
| NCO:OH | 1.4 | 1.4 | 1.4 | 1.4 |
| Viscosity [Pa · s] | | | | |
| 90° C. | — | — | — | — |
| 110° C. | — | — | — | — |
| 130° C. | 43 | 22 | 24 | 27 |
| 150° C. | — | — | — | — |
| 170° C. | — | — | — | — |
| Peel strength* (SBR/Man made) [kg/cm] | | | | |
| after 5 min | 3.6 | 3.6 | 3.6 | 3.6 |
| after 3 days | — | — | — | — |
| Creep resistance | good | — | good | good |
| Mature bond strength (leather/SBR) [kg/cm] | | | | |
| after 7 days | 2.5 | — | 7.1 | 4.5 |

Examples

|  | Examples | |
|---|---|---|
|  | 10 | 11 |
| Polyester A | 22.9% | 22.7% |
| Polyester B | 11.5% | 12.9% |
| Polyester C | 5.7% | 6.4% |
| Polyester D | 5.7% | 6.4% |
| Polypropylene glycol | 22.9% | 19.3% |
| Tackifier | 5.7% | 6.4% |
| Hydrocarbon resin | — | — |
| MDI | 25.5% | 25.9% |
| NCO:OH | 1.5 | 1.5 |
| Viscosity [Pa.s] | | |
| 90° C. | — | — |
| 110° C. | 37 | — |
| 130° C. | 14 | 13 |
| 150° C. | — | — |
| 170° C. | — | — |
| Peel strength* (SBR/Man made) [kg/cm] | | |
| after 5 min | 2.0 | 3.9 |
| after 3 days | — | — |

Example 12

This example illustrates preferred formulations for the adhesive compositions of the invention.

| Material | A | B | C | D | E |
|---|---|---|---|---|---|
| PPG 425 | 29.53% | 23.45% | 28.17% | 23.34% | 23.34% |
| Polyester A | 24.61% | 29.31% | 23.47% | 23.34% | 29.17% |
| Polyester B | 4.92% | 5.86% | 4.69% | 11.67% | 5.83% |
| Polyester I | 4.92% | 5.86% | 4.69% | 5.83% | 5.83% |
| Polyester C | 4.92% | 5.86% | 4.69% | 5.83% | 5.83% |
| Hydrocarbon resin | 4.92% | 5.86% | 9.38% | — | — |
| Tackifier | — | — | — | 5.83% | 5.83% |
| MDI | 26.18% | 23.80% | 24.91% | 24.16% | 24.15% |
| NCO:OH ratio | 1.3:1 | 1.4:1 | 1.3:1 | 1.4:1 | 1.4:1 |
| Viscosity 130° C. [Pa · s] | 45–60 | 27–32 | 85 | 27 | 43 |
| Initial strength [kg/cm] at 12.5 cm/min | 4.1–5.9 | 5.3 | 4.5 | 2.0 | 4.5 |

In the above adhesives, PPG 425 represents polypropylene glycol having an average molecular weight of 425. The polyester glycols A, B, C, and I have been described above. The tackifier is a polymerized β-pinene resin. MDI represents 4,4'-diphenylmethane diisocyanate.

The initial strength was determined using NBR/NBR sample strips being 2.5 cm wide and 12.5 cm long preheated to 80–100° C. The adhesive was applied on both strips at a temperature of about 180° C., and the strips were pressed together at 7 bars (ca. 100 psi) for about 1 minute. It should be noted here that lower pressures for pressing the strips together may be used depending on the available equipment. The aforementioned NBR sample strips comprise a nitrile rubber base having a Shore A hardness of 80, and are available from Prüf- und Forschungsinstitut für die Schuhherstellung, Pirmasens, Germany.

The initial strength was determined at a speed of 12.5 cm/min (5 inch/min). The resulting values were converted from [phi] to [kg/cm] using the factor 5.61.

Example 13

This example demonstrates that satisfactory polyurethane hot-melt adhesives may also be prepared using high molecular weight polyesters. Similarly, the content of polypropylene glycol is of importance here.

| Material | |
|---|---|
| PPG 425 | 34.4% |
| Polyester H | 34.4% |
| MDI | 31.2% |
| NCO:OH ratio | 1.4:1 |
| Viscosity, 130° C., | 125 |
| 180° C. [Pa · s] | 20 |
| Initial strength [kg/cm] at 12.5 cm/min | 4.4–4.8 |

Example 14

This example illustrates a method of adhesively bonding a styrene/butadiene rubber sole to a leather shoe upper, and comprises the following steps:

The sole was first coated with a conventional primer solution, and the leather shoe upper was roughened by conventional means. A layer about 0.5 mm thick was formed. The sole and shoe upper were pressed together in a shoe press machine at a gauge pressure of between 10–20 bars, and after about 5 minutes, pressed again under a pressure of between 10–20 bars. Initial and final strength of the shoe assembly were considered satisfactory for further processing and use.

I claim:

1. A moisture-curing polyurethane hot-melt adhesive composition comprising at least one polyurethane prepolymer, said polyurethane prepolymer being the reaction product of reactants comprising:
    a) at least one aromatic polyisocyanate,
    b) at least one polyalkylene glycol at a concentration of more than 10% by weight based on total hot-melt adhesive, and
    c) only one polyester glycol having a glass transition temperature of from −40° C. to +50° C.;
said reactants being characterized by the essential absence of polyalkylene polyols other than linear polyethers having two OH groups.

2. The composition as claimed in claim 1 wherein said prepolymer is the reaction product of reactants comprising:
    a) from 15 to 35% by weight of aromatic polyisocyanate,
    b) from 10 to 70% by weight of polyalkylene glycol, and
    c) from 5 to 65% by weight of said polyester glycol.

3. The composition as claimed in claim 2 wherein said prepolymer is comprised of 15 to 35% by weight of said polyalkylene glycol and 30 to 50% by weight of said polyester glycol.

4. The composition as claimed in claim 1 wherein said aromatic polyisocyanate is selected from the group consisting of toluene diisocyanate, 4,4'-diphenylmethane diisocyanate, 2,4'-diphenylmethane diisocyanate and mixtures thereof.

5. The composition as claimed in claim 1 wherein said polyalkylene glycol is a polypropylene glycol having a molecular weight of from 250 to 1,000.

6. The composition as claimed in claim 1 wherein the molecular weight of said polyester glycol is between 1,500 and 30,000.

7. The composition as claimed in claim 1 wherein said polyester glycol is liquid, amorphous, or weakly crystalline.

8. The composition as claimed in claim 1 further comprising a resin.

9. The composition as claimed in claim 8 wherein said resin is effective to improve the creep compliance of said composition.

10. The composition as claimed in claim 8 wherein said resin is a hydrocarbon resin.

11. The composition as claimed in claim 8 wherein said resin is present in said composition in an amount of up to 15% by weight of said composition.

12. The composition as claimed in claim 1 further comprising a stabilizer.

13. The composition as claimed in claim 12 wherein said stabilizer is present in said composition in an amount of up to 0.5% by weight of said composition.

14. The composition as claimed in claim 11 wherein said prepolymer shows only one glass transition.

15. The composition as claimed in claim 11 wherein said composition has a melt viscosity ranging from 10 to 300 Pa.s at 130° C.

16. The composition as claimed in claim 11 wherein the ratio of reactive groups NCO:OH of said reactants is from 1.1:1 to 2:1.

17. The composition as claimed in claim 11 wherein the ratio of reactive groups NCO:OH of said reactants is selected such that the hot-melt adhesive has initial strength, but sufficiently low viscosity to be applied without solvent.

18. The composition as claimed in claim 1 wherein said hot-melt adhesive has from 0.5 to 3 gram of free NCO groups per 100 gram of hot-melt adhesive.

19. A process for the production of a moisture-curing hot-melt adhesive composition, said process comprising reacting reactants comprised of:
    a) at least one aromatic polyisocyanate,
    b) at least one polyalkylene glycol at a concentration of more than 10%
       by weight based on total hot-melt adhesive, and
    c) only one polyester glycol having a glass transition temperature of from −40%° C. to +50%° C.;
said reactants being characterized by the essential absence of polyalkylene polyols other than linear polyethers having two OH groups.

20. The process as claimed in claim 19 wherein said reacting is a single step.

21. The process as claimed in claim 19 wherein said reacting is in multiple steps.

22. A moisture-curing polyurethane hot-melt adhesive composition comprising at least one polyurethane prepolymer, said polyurethane prepolymer being the reaction product of reactants comprising:
    a) from 15 to 35% by weight, based on the weight of the adhesive composition, of an aromatic polyisocyanate selected from the group consisting of toluene diisocyanate, 4,4'-diphenylmethane diisocyanate, 2,4'-diphenylmethane diisocyanate, and mixtures thereof;
    b) from 10 to 70% by weight, based on the weight of the adhesive composition, of a polypropylene glycol having an average molecular weight of between 250 and 1,000; and
    c) from 5 to 65% by weight, based on the weight of the adhesive composition, of only one polyester glycol having a glass transition temperature of from −40° C. to +50° C., said polyester glycol having a molecular weight between 1,500 and 30,000;
said reactants being characterized by the essential absence of polyalkylene polyols other than linear polyethers having two OH groups.

23. The composition as claimed in claim 22 further comprising from 3 to 10% by weight, based on the weight of the adhesive composition, of a hydrocarbon resin.

24. The composition as claimed in claim 22 further comprising up to 0.5% by weight, based on the weight of the adhesive composition, of a stabilizer.

25. The composition as claimed in claim 22 further comprising from 0.5 to 1% by weight, based on the weight of the adhesive composition, of a polyurethane catalyst.

26. The composition as claimed in claim 22 wherein said prepolymer has only one glass transition temperature.

27. The composition as claimed in claim 22 wherein said composition has a melt viscosity ranging from 20 to 100 Pa.s at 130° C.

28. The composition as claimed in claim 22 wherein the ratio of reactive groups NCO:OH of said reactants is from 1.15:1 to 1.5:1.

29. The composition as claimed in claim 22 wherein the molecular weight of the polypropylene glycol is from 400 to 450.

30. The composition as claimed in claim 22 wherein the glass transition temperature of said polyester glycol is less than 0° C.

31. The composition as claimed in claim 22 wherein said composition has from 1.0 to 2 grams of free NCO groups per 100 grams of the composition.

32. The composition as claimed in claim 22 wherein said polyester glycol is partially crystalline.

33. The composition as claimed in claim 22 wherein the molecular weight of said polyester glycol is between 2,500 and 6,000.

34. The composition as claimed in claim 22 wherein said polyester has a glass transition temperature of −40° C. to +40° C., a viscosity of about 3,000 to about 30,000 mPa.s at 130° C., and a hydroxyl number of about 27 to 60.

* * * * *